(12) United States Patent
Dee et al.

(10) Patent No.: US 6,824,590 B2
(45) Date of Patent: Nov. 30, 2004

(54) USE OF LITHIUM-CONTAINING FAU IN AIR SEPARATION PROCESSES INCLUDING WATER AND/OR CARBON DIOXIDE REMOVAL

(75) Inventors: Douglas Paul Dee, Fogelsville, PA (US); Robert Ling Chiang, Basking Ridge, NJ (US); Gregory John Gondecki, Nesquehoning, PA (US); Roger Dean Whitley, Allentown, PA (US); Jane Elizabeth Ostroski, New Tripoli, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/341,663

(22) Filed: Jan. 13, 2003

(65) Prior Publication Data

US 2003/0106430 A1 Jun. 12, 2003

Related U.S. Application Data (63) Continuation-in-part of application No. 09/707,317, filed on Nov. 7, 2000, now abandoned.

(51) Int. Cl.$^7$ ............................................. B01D 53/02
(52) U.S. Cl. .......................... 95/117; 95/130; 95/139; 95/900; 95/902
(58) Field of Search .................... 95/130, 117, 139, 95/138, 900, 902; 502/411, 415

(56) References Cited

U.S. PATENT DOCUMENTS

| | | | |
|---|---|---|---|
| 3,636,679 A | 1/1972 | Batta | 55/26 |
| 5,133,784 A | 7/1992 | Boudet et al. | 55/25 |
| 5,203,887 A | 4/1993 | Toussaint | 55/25 |
| 5,531,808 A | 7/1996 | Ojo et al. | 95/96 |
| 5,562,756 A | 10/1996 | Coe et al. | 95/96 |
| 5,584,912 A | 12/1996 | Li et al. | 95/96 |
| 5,658,370 A | 8/1997 | Vigor et al. | 95/96 |
| 5,674,311 A | 10/1997 | Notaro et al. | 95/96 |
| 5,810,909 A | 9/1998 | Notaro et al. | 95/96 |

(List continued on next page.)

FOREIGN PATENT DOCUMENTS

| | | | |
|---|---|---|---|
| CA | 2182641 | 2/1997 | B01D/53/04 |
| CA | 2234924 | 10/1998 | B01D/53/047 |
| EP | 0718024 | 6/1996 | B01D/53/02 |
| EP | 0997190 | 5/2000 | B01J/20/28 |
| EP | 1005904 | 6/2000 | B01J/20/18 |
| EP | 1 205 231 A1 | 5/2002 | |

OTHER PUBLICATIONS

Ind. Eng. Chem. "Limits for Air Separation by Adsorption with . . . "Rege, et al (1997).

Amer. Chem. Soc. Advances In Chem. Series 102 Molecular Sieve Zeolites II (1971).

"Zeolites of Adsorption of $CO_2$ and $NH_3$ On Synthetic Zeolites of . . . ", Vasl'eva and Khvoshchev, 1984.

*Primary Examiner*—Duane S. Smith
(74) *Attorney, Agent, or Firm*—Geoffrey L. Chase (57) ABSTRACT

A process for separating a feed gas into at least one product gas includes: (a) providing a gas separation apparatus with at least one adsorption layer including a lithium-exchanged FAU adsorbent having water desorption characteristics, defined by drying curves, similar to those for the corresponding fully sodium-exchanged FAU, a heat of adsorption for carbon dioxide equal to or lower than that for the corresponding fully sodium-exchanged FAU at high loadings of carbon dioxide, and onto which the adsorption layer water and/or carbon dioxide adsorb; (b) feeding into the gas separation apparatus a feed gas including nitrogen, oxygen, and at least one of water and carbon dioxide; and (c) collecting from a product end of the gas separation apparatus at least one product gas containing oxygen.

10 Claims, 7 Drawing Sheets

U.S. PATENT DOCUMENTS

| | | | |
|---|---|---|---|
| 5,868,818 A | 2/1999 | Ogawa et al. | 95/96 |
| 5,980,611 A | 11/1999 | Kumar et al. | 95/101 |
| 6,068,678 A | 5/2000 | Labasque et al. | 95/96 |
| 6,083,301 A | 7/2000 | Gary et al. | 95/130 |
| 6,136,069 A | 10/2000 | MacDougall et al. | 95/90 |
| 6,171,370 B1 | 1/2001 | Hirano et al. | 95/96 |
| 6,238,460 B1 | 5/2001 | Deng et al. | 95/98 |
| 6,261,344 B1 | 7/2001 | Labasque et al. | 95/96 |
| 6,270,557 B1 | 8/2001 | Millet et al. | 95/96 |
| 6,309,445 B1 | 10/2001 | Gittleman et al. | 95/96 |
| 6,350,298 B1 | 2/2002 | Su et al. | 95/96 |
| 6,423,121 B1 * | 7/2002 | Kiyama et al. | 95/130 |
| 6,468,328 B2 * | 10/2002 | Sircar et al. | 95/101 |
| 6,478,854 B1 * | 11/2002 | Kotagiri et al. | 95/96 |
| 6,652,626 B1 * | 11/2003 | Plee | 95/96 |
| 2001/0049998 A1 * | 12/2001 | Rode et al. | 95/117 |
| 2002/0144596 A1 * | 10/2002 | Dee et al. | 95/96 |
| 2003/0106430 A1 * | 6/2003 | Dee et al. | 95/117 |

\* cited by examiner

Figure 1. NaX Water Desorption Curve

Figure 2. CaX Water Desorption Curves

USE OF LITHIUM-CONTAINING FAU IN AIR SEPARATION PROCESSES INCLUDING WATER AND/OR CARBON DIOXIDE REMOVAL

CROSS-REFERENCE TO RELATED APPLICATIONS

This is a continuation in part to U.S. application Ser. No. 09/707,317 filed Nov. 7, 2000 now abandoned.

STATEMENT REGARDING FEDERALLY SPONSORED RESEARCH OR DEVELOPMENT

Not applicable.

BACKGROUND OF THE INVENTION

This invention relates to pressure swing adsorption (PSA) systems. More particularly, it relates to the use of a PSA system in the separation of a gas mixture containing oxygen and nitrogen, and the removal of feed impurities, such as water and/or carbon dioxide, by using lithium-containing FAU adsorbents.

PSA systems are particularly suitable for a wide variety of important commercial applications. For example, high purity oxygen is used in various industries, such as chemical processing, steel mills, paper mills, and lead and gas production operations.

In a PSA process, a feed gas mixture, such as air, containing a more readily adsorbable component and a less readily adsorbable component, e.g., the nitrogen and oxygen components of air, is passed through the feed end of an adsorbent bed capable of selectively adsorbing the more readily adsorbable component at an upper adsorption pressure. The less readily adsorbable component passes through the bed and is recovered from the discharge end of the bed. Thereafter, the bed is depressurized to a lower desorption pressure for desorption of the more readily adsorbable component, and its removal from the bed prior to the introduction of additional quantities of the feed gas mixture for repressurization and adsorption as cyclic adsorption-desorption-repressurization operations are continued in the bed. Such PSA processing is commonly, but not exclusively, carried out in multi-bed systems, with each bed employing the PSA processing sequence on a cyclic basis interrelated to the carrying out of such processing sequence in the other beds of the adsorption system.

In PSA systems for the recovery of high-purity oxygen product as the less readily adsorbable component of air, each adsorbent bed will commonly contain an adsorbent material capable of selectively adsorbing nitrogen as the more readily adsorbable component, with the selectively adsorbed nitrogen being subsequently desorbed from the bed upon reduction of the pressure of the bed from the upper adsorption pressure level to the lower desorption pressure level. When the lower pressure level is below atmospheric pressure, it is generally referred to as Vacuum Swing Adsorption (VSA). However, for purposes of simplicity, the term "PSA" shall be used hereinafter to denote both PSA and VSA systems unless noted otherwise.

In addition to nitrogen and oxygen, a feed gas mixture may contain impurities, such as water and carbon dioxide. Conventional wisdom teaches that it is necessary to remove water and carbon dioxide, so as to avoid poisoning the nitrogen adsorbing capacity of high-capacity main-stage adsorbents. This removal can be accomplished through the use of either a separate pretreatment material or a separate pretreatment stage.

For instance, Canadian Patent Application No. 2,234,924 to Ackley discloses the removal of feed stream contaminants, typically water and carbon dioxide, in a pretreatment stage at the feed end of the adsorbent bed, by use of material selected from the group consisting of zeolites, activated alumina, activated carbon and silica gel. Lithium-exchanged zeolites are taught to be useful in the main stage of the disclosed process.

Canadian Patent Application No. 2,182,641 discloses a PSA process using two layers of adsorbent materials comprising a first adsorbent layer of NaX and a second adsorbent layer of LiX. It also discloses that the gas stream can be dried before passage through the zeolite packing, by means of a drying layer of silica gel.

U.S. Pat. No. 5,810,909 discloses the use of a pretreatment zone containing, e.g., alumina, to remove water and carbon dioxide before bulk separation through multiple adsorbent layers that can include lithium-exchanged zeolites.

Likewise, Rege et al., "Limits for Air Separation by Adsorption with LiX Zeolite" Ind. Eng. Chem. Res. (1997), vol 36, pp. 5358–5365, teaches the use of a pretreatment bed to remove water and carbon dioxide from the feed gas before it enters the main LiX bed.

U.S. Pat. No. 3,636,679 discloses an apparatus in which CaA is used as the only adsorbent and the inventors explicitly state that the air is fed without pretreatment to remove water or $CO_2$. However, CaA's air separation performance is inferior to those of lithium-exchanged FAUs.

U.S. Pat. No. 5,133,784 discloses an apparatus in which flow is radial in a bed composed of co-annular cylinders. The apparatus is said to be suitable for separating at least one component, such as oxygen, from a gaseous mixture. Alumina is the only adsorbent mentioned.

U.S. Pat. No. 5,203,887 discloses replacing a portion of an adsorbent bed of the lithium-exchanged zeolite type with an adsorbent of another type. This is achieved by utilizing an adsorption zone including two adsorbent beds arranged in series. The first bed comprises a zeolite X exchanged to at least 80% with lithium, and the second bed comprises an unexchanged conventional zeolite X, such as NaX. The precise nature of the feed gas is not described, and there is no suggestion in this patent that feed gases containing carbon dioxide and/or water can be fed to the lithium-exchanged zeolite without pretreatment to remove carbon dioxide and water.

U.S. Pat. No. 5,658,370 discloses a process for the separation of nitrogen from a gaseous mixture, such as air, by selective adsorption of nitrogen on an adsorbent mass, using a rotating radial flow bed geometry, wherein at least 50% of the adsorbent mass consists of at least one lithium-exchanged zeolite with an exchange level ranging from 50% to 95%. However, this patent is silent on the issue of the removal of water and carbon dioxide.

Avgul et al., "Heats of Adsorption on X-Type Zeolites Containing Different Alkali Metal Cations", Molecular Sieve Zeolites—II, Advances in Chemistry Series 102, 1971, pp. 184–192, compares the heat of adsorption of water in LiX to that of NaX. The authors speculate that this initial water adsorption probably occurs on the $S_{III}$ cation sites. Li, Na, and K-exchanged X all show initially high heats of adsorption. Li and NaX are very similar[3] after water adsorption progresses to the $S_{II}$ and $S_{I'}$ cation sites.

Information on $CO_2$ adsorption is provided by Vasil'eva and Khvoshchev, "Heats of Adsorption of $CO_2$ and $NH_3$ on Synthetic Zeolites of Different Structural Types. Communication 3. $CO_2$ Adsorption on Li, Na, and K forms of X and Y Zeolites.", Izvestiya Akademii Nauk SSSR, Seriya Khimicheskaya, No. 9, pp1942–1947, September 1984 (translation by I. V. Grebenshchikov, Institute of Silicate Chemistry). In FIG. 4 of this article, the $CO_2$ heats of adsorption for KX, NaX, and LiX are plotted as a function of $CO_2$ loading. For the first 20 or so $CO_2$ molecules per unit cell, the heat of adsorption is highest for LiX. However, beyond that loading, the heat of adsorption decreases for LiX and actually becomes much lower than for NaX or KX. This behavior is similar to that reported by Avgul et al. for the water heat of adsorption. Thus, after a certain initial loading, the LiX actually has equal or lower affinity for water and carbon dioxide than the common pretreatment adsorbent, NaX.

It would be desirable to provide a process for isolating oxygen from a feed gas containing oxygen, nitrogen, and at least one of water and carbon dioxide, wherein at least one adsorbent used to separate oxygen from nitrogen can also remove water and carbon dioxide from the feed gas without being entirely poisoned thereby.

All references cited herein are incorporated herein by reference in their entireties.

BRIEF SUMMARY OF THE INVENTION

Accordingly, the invention provides a process for separating a feed gas into at least one product gas, comprising: (a) providing a gas separation apparatus comprising at least one adsorption layer comprising a lithium-exchanged FAU having water desorption characteristics, defined by drying curves, similar to those for the corresponding fully sodium-exchanged FAU, a heat of adsorption for carbon dioxide equal to or lower than that for the corresponding fully sodium-exchanged FAU at high loadings of carbon dioxide, and onto which said adsorption layer water and/or carbon dioxide adsorb, (b) feeding into the gas separation apparatus a feed gas including nitrogen, oxygen, and at least one of carbon dioxide and water; and (c) collecting from a product end of the gas separation apparatus at least one product gas comprising oxygen.

DETAILED DESCRIPTION OF THE INVENTION

The process of the invention employs FAU adsorbents that possess highly desirable capacity and selectivity for the adsorption of nitrogen from air or other streams containing nitrogen and less polar or less polarizable molecular species, such as oxygen, and also possess favorable water and carbon dioxide adsorption and desorption characteristics. In preferred embodiments, the separation of nitrogen from oxygen, as well as the removal of feed impurities, such as water and/or carbon dioxide, is achieved through the use of a single FAU adsorbent, essentially eliminating the pretreatment stage from the system. Such an elimination would still generate the preferred temperature profile along the adsorbent bed, and would, in addition, simplify the design and reduce the cost. Those skilled in the art will appreciate that the ability of lithium-exchanged FAU adsorbents to remove water and/or carbon dioxide can also allow one to use thinner layers of traditional pretreatment adsorbents, such as NaX or mixtures of NaX and Li-exchanged FAUs. Such a layering or mixing of adsorbents is still within the scope of this invention if some water and/or carbon dioxide removal is performed by the Li-exchanged FAU adsorbent.

Feed gases suitable for use in the invention contain oxygen, nitrogen and water and/or carbon dioxide. Preferably, the feed gas is air.

Adsorbents suitable for use in the invention are adapted to separate nitrogen from oxygen in the presence of water and/or carbon dioxide. Preferred adsorbents possess the following properties: water desorption characteristics, defined by drying curves, similar to those for the corresponding fully sodium-exchanged FAU, and a heat of adsorption for carbon dioxide equal to or lower than that for the corresponding fully sodium-exchanged FAU at high loadings of carbon dioxide.

The drying curves to define the water desorption characteristics were generated in the following manner. All sample treatment and analyses were performed on a Cahn 1100 microbalance. Gas flow meters were used to control the amount of helium delivered to the system. Ball valves were used to switch from the wet purge gas to dry helium gas. The dew point of the drying gas was measured at the entrance and exit of the sample bed. The recorder was calibrated with a 10 milligram class A weight on the 1 milligram scale under the same conditions as in the desorption experiment. In order to obtain a true sample weight, the sample pan and reference pan were zeroed under the same flow and temperature conditions at which the desorption experiment was conducted.

The samples, F9HA (NaX from TOSOH), SA-600 and VSAII (CaX from TOSOH and UOP, respectively), and NSA-100 and Z10-05-03 (Li-exchanged X from TOSOH and Zeochem, respectively) were screened to particle sizes between 1.00 mm to 1.40 mm to minimize any effects that particle size might have on drying equilibrium. Prior to the experiment the samples were saturated at 30° C. with wet helium gas to attain a constant loading. The conditions for the desorption experiment were a 23 cc/min flow rate of helium and the sample bed temperature of 30° C. During the course of the desorption experiment, weight readings were collected at specific time intervals so that a drying curve profile could be plotted.

The amount desorbed is measured from changes in the microbalance weight readings. For FIGS. 1, 2, and 3, the fractional desorption curves are defined as $(M_i-M_t)/(M_i-M_{200})$ versus time in minutes, where $M_i$ is the initial fully hydrated weight, $M_t$ is the weight for given time after starting the dry He flow and $M_{200}$ is the weight at 200 minutes after starting the dry He flow.

Figure 1:
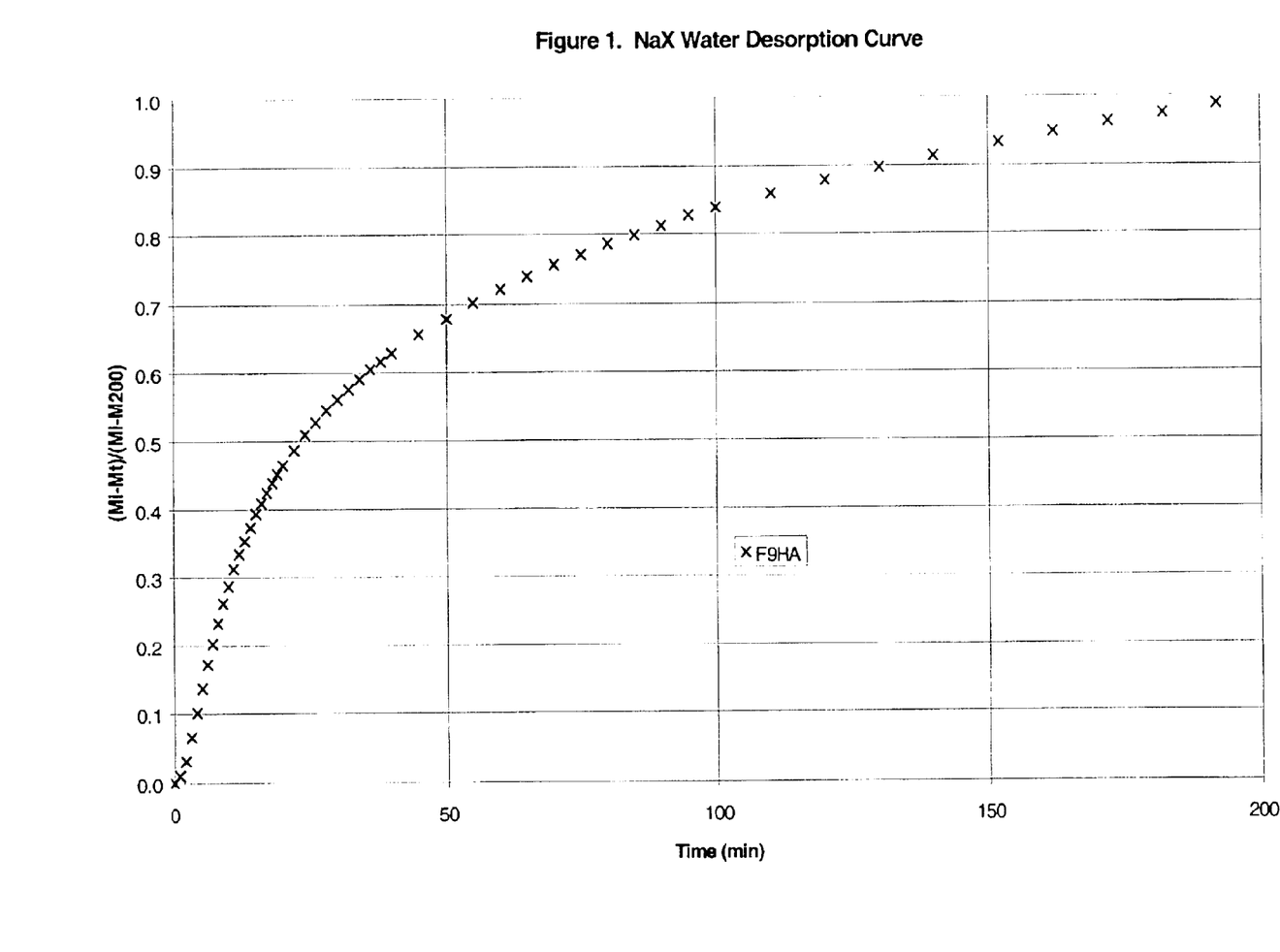
FIG. 1 is a graph showing water desorption versus time for a NaX material.
Figure 2:
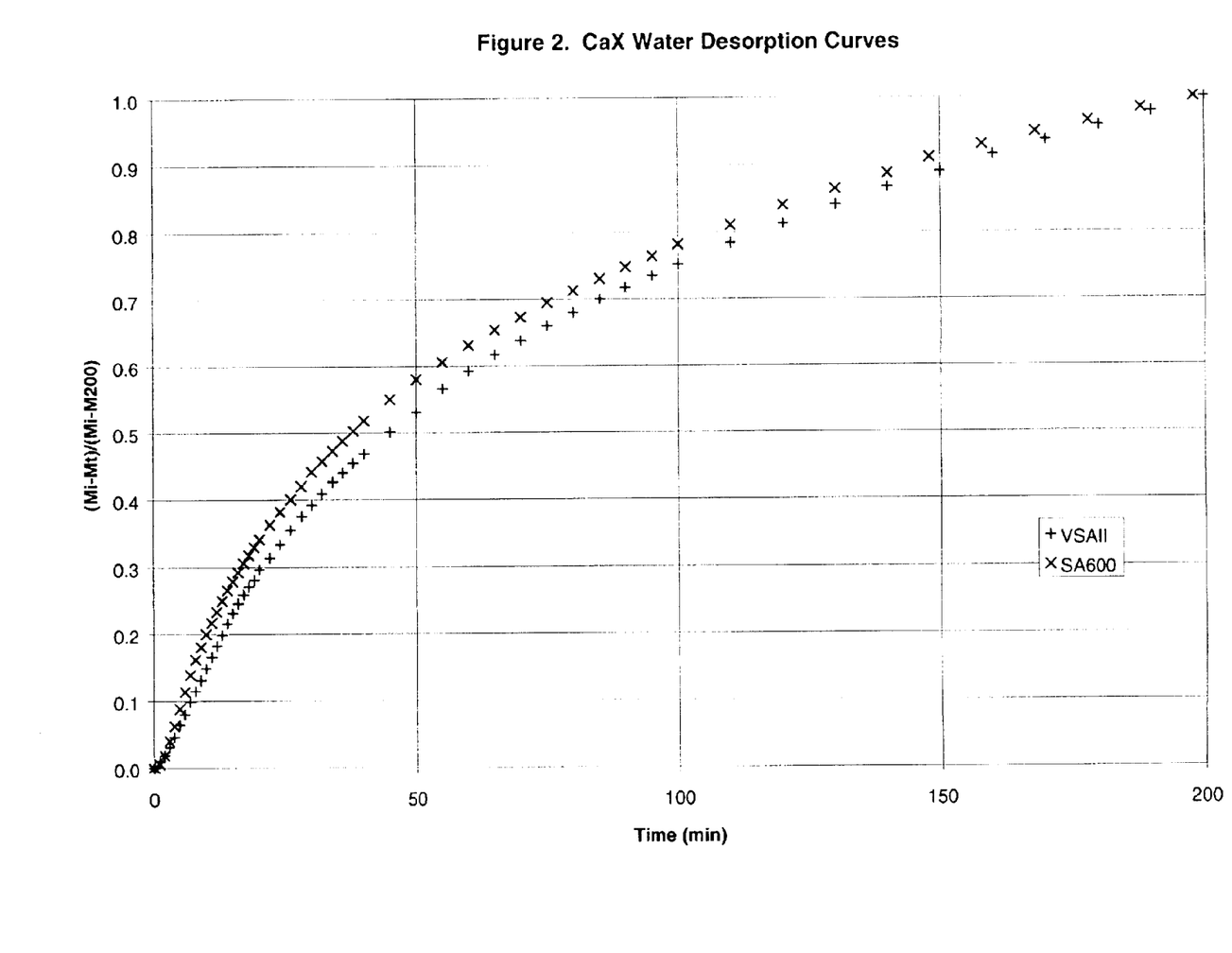
FIG. 2 is a graph showing water desorption versus time for two CaX materials (VSAII, SA600)
Figure 3:
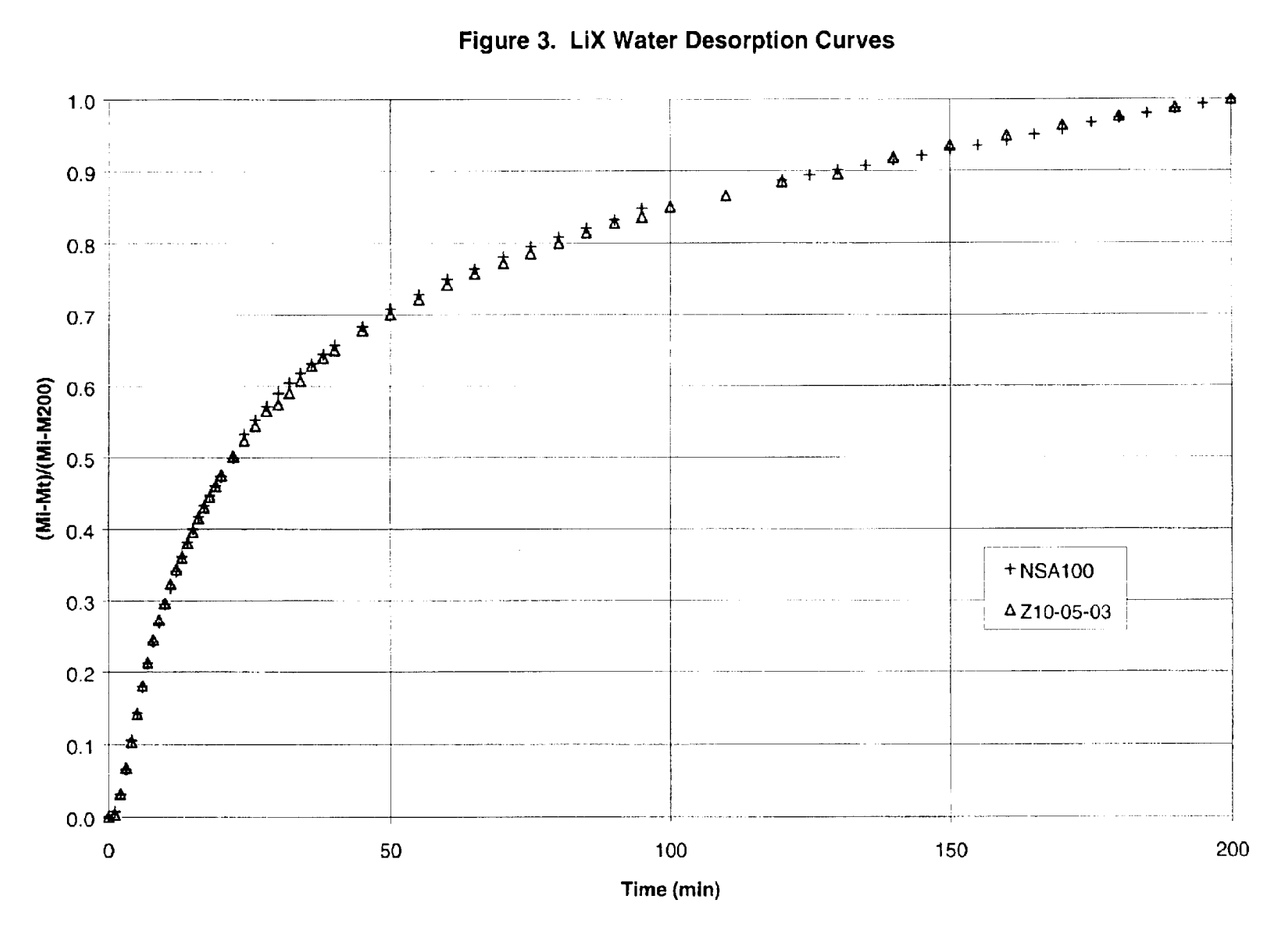
FIG. 3 is a graph showing water desorption versus time for two LiX materials (NSA100, Z10-05-03)

FIG. 1 contains the drying curve for NaX, which is commonly used in the art as a pretreatment adsorbent for water and carbon dioxide removal. FIG. 2 contains drying curves for two CaX materials. The initial slopes of the curves are smaller for the CaX materials than for NaX, indicating slower water desorption, which means isothermal regeneration by a purge gas is more difficult for CaX than for NaX. FIG. 3 shows the drying curves for two LiX materials. These curves are essentially the same as that for NaX. This indicates a similar ability to remove water from LiX adsorbents by ambient purge gas, which is the current state of the art in oxygen production by PSA.

The adsorbent employed in this invention is a zeolite with a FAU structure and lithium-exchanged cation sites. The adsorbent preferably has a Si/Al ratio between 1.0 and 1.3 and a lithium exchange level of more than 67%, more preferably 78% or higher. The adsorbent preferably contains less than 0.01% Ca, less than 0.01% Mg and/or less than 0.01% total divalent cations.

An advantage of substantially excluding calcium and magnesium cations from the adsorbent is that the efficiency of the adsorbent has a greater resistance to the negative effects of water than a comparable adsorbent containing at least 0.01% Ca and/or 0.01% Mg. Thus, the productivity of the process for producing the product gas diminishes as a function of an amount of water adsorbed more slowly than a reference productivity of a reference process identical to the inventive process but for the use of a lithium-exchanged FAU adsorbent containing at least 0.01% calcium and/or at least 0.01% magnesium. The inventive process can therefore be effectively performed without pretreating water-containing feed gases, even feed gases having relative humidities greater than 70%.

Specific, non-limiting examples of suitable adsorbents include lithium-exchanged low-silica X zeolite (i.e., LiMLSX), wherein the M represents one or more elements selected from alkaline, alkaline-earth, transition metals and rare-earth groups. Although certain adsorbents encompassed by the foregoing definition have been used in PSA processes to separate oxygen from nitrogen, it was conventionally understood that such adsorbents would be rendered ineffective by the presence of carbon dioxide and/or water in the gas contacting the adsorbent. This invention is based, at least in part, on the surprising discovery that these materials reversibly adsorb water and carbon dioxide at high loading, which runs counter to conventional wisdom in the art.

Additional adsorbents differing from the above described adsorbents can be employed downstream of the feed end of the gas separation apparatus, or even as minor components of an adsorbent mixture at the feed end. These different adsorbents need not, by themselves, be effective in totally removing carbon dioxide and/or water from a gas. Thus, suitable additional adsorbents are not particularly limited, and can include, e.g., CaA, NaX, CaX, alumina, silica gel.

The invention is useful for obtaining enriched oxygen gas. In embodiments, the inventive process provides a product gas preferably containing at least 85% oxygen. The invention is adaptable to a wide variety of separation apparatuses and separation schemes. Suitable gas separation apparatuses for use in the process of the invention include, e.g., radial flow, vertical flow, and cross flow configurations.

The invention will be illustrated in more detail with reference to the following Examples, but it should be understood that the present invention is not deemed to be limited thereto.

EXAMPLE 1

Figure 4:
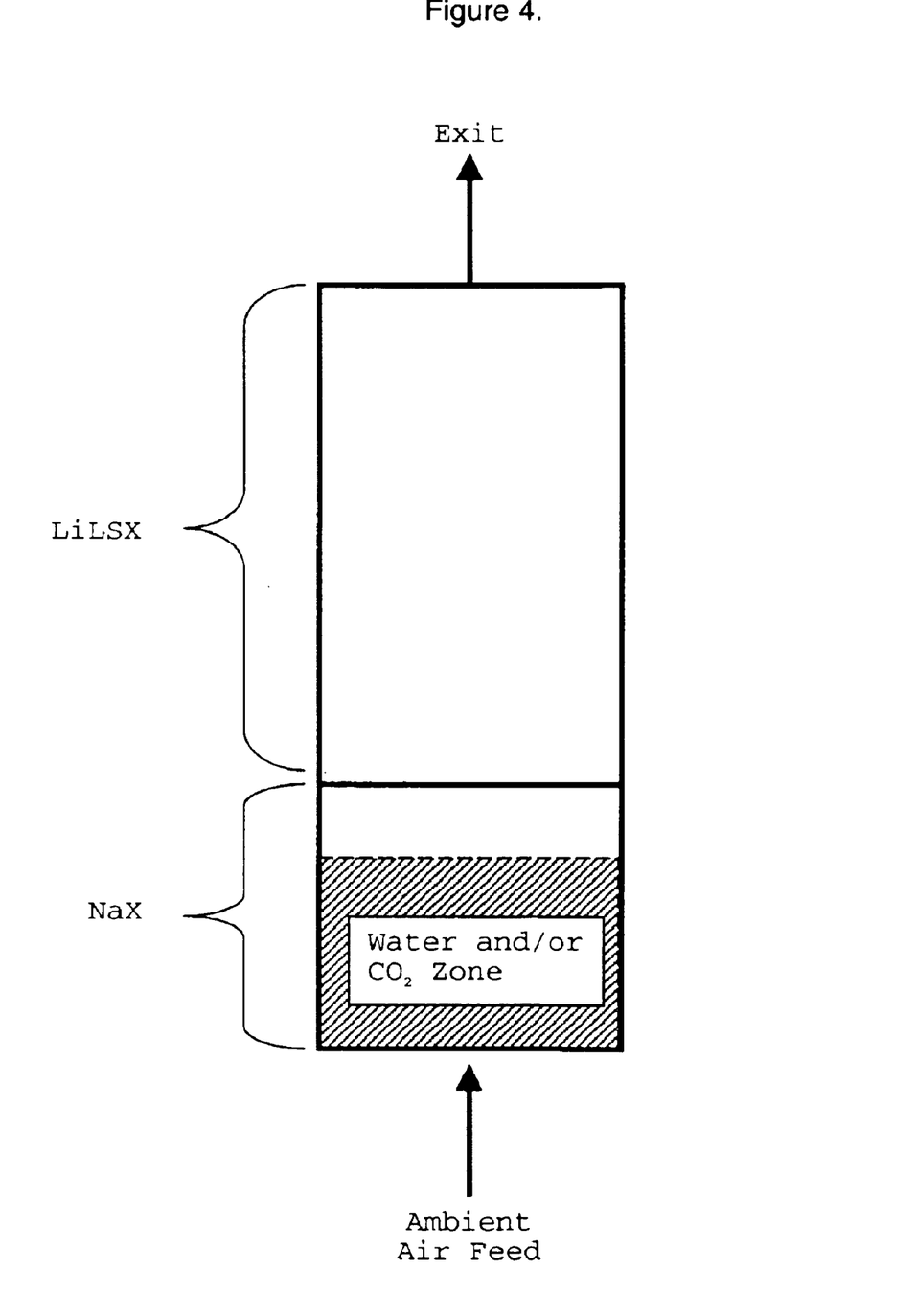
FIG. 4 is a schematic diagram of a vertical bed for carrying out typical gas separations.

The drawings in FIGS. 4 through 7 are for illustrative purposes only and are not to scale. FIG. 4 shows a vertical bed with a conventional adsorbent configuration of NaX pretreatment, followed by LiLSX main adsorbent. The height of the typical NaX layer represents approximately 20% of the total bed height. This quantity of pretreatment is greater than the minimum needed for water and/or carbon dioxide to insure those gases do not penetrate into the main adsorbent. However, it is well known in the art that the extra NaX does not perform as well as LiLSX for oxygen/nitrogen separation. Note that actual water and/or carbon dioxide penetration is dependent upon the specific cycle and operating conditions.

Figure 5:
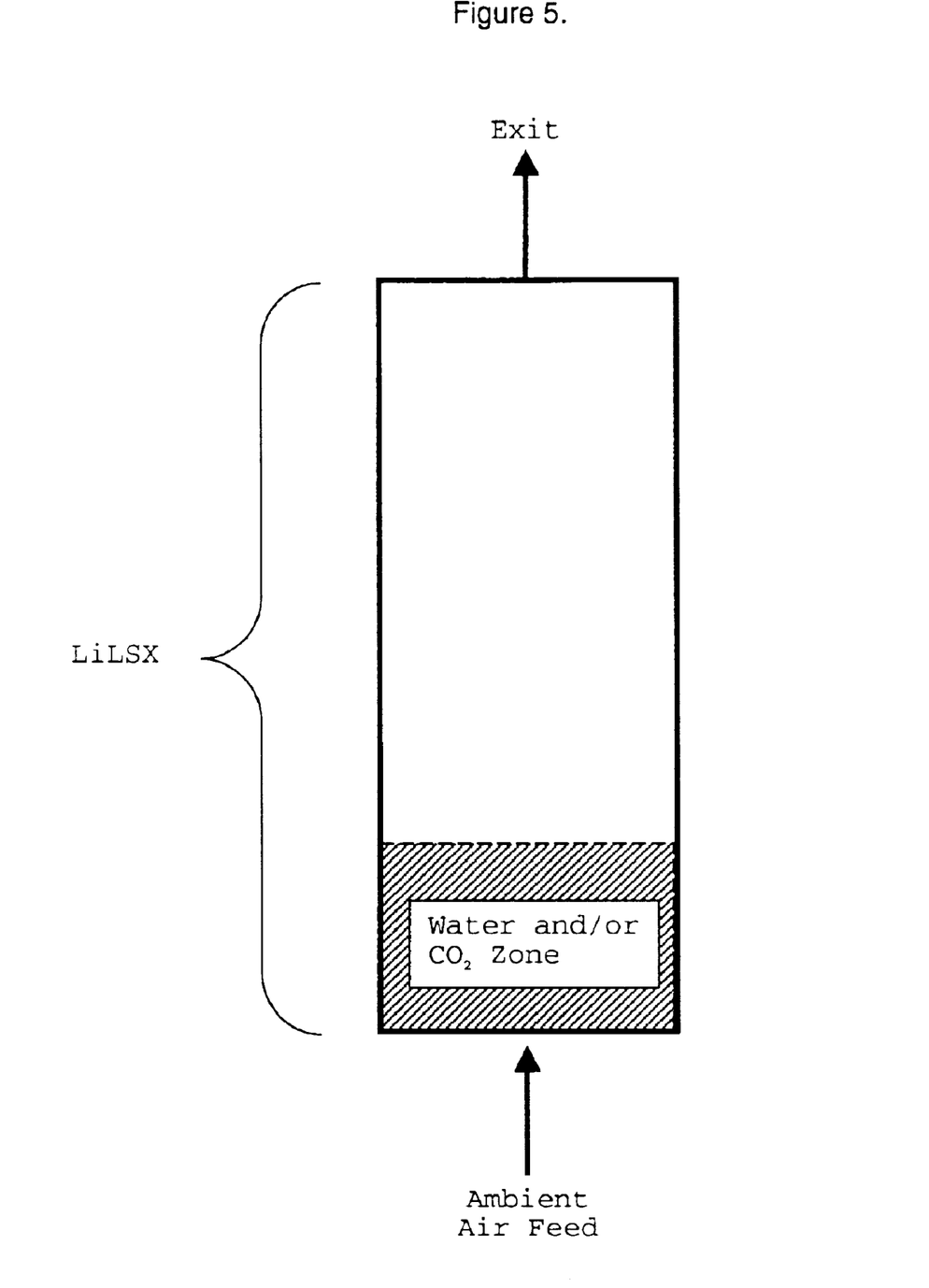
FIG. 5 is a schematic drawing of an embodiment of the present invention.

FIG. 5 shows an embodiment of the invention. The entire bed is comprised of LiLSX and water and/or carbon dioxide penetrate into the LiLSX layer. Consequently, the portion of the adsorbent bed that is not required for water and/or carbon dioxide adsorption is now LiLSX, with oxygen/nitrogen separation parameters superior to those of NaX.

EXAMPLE 2

Figure 6:
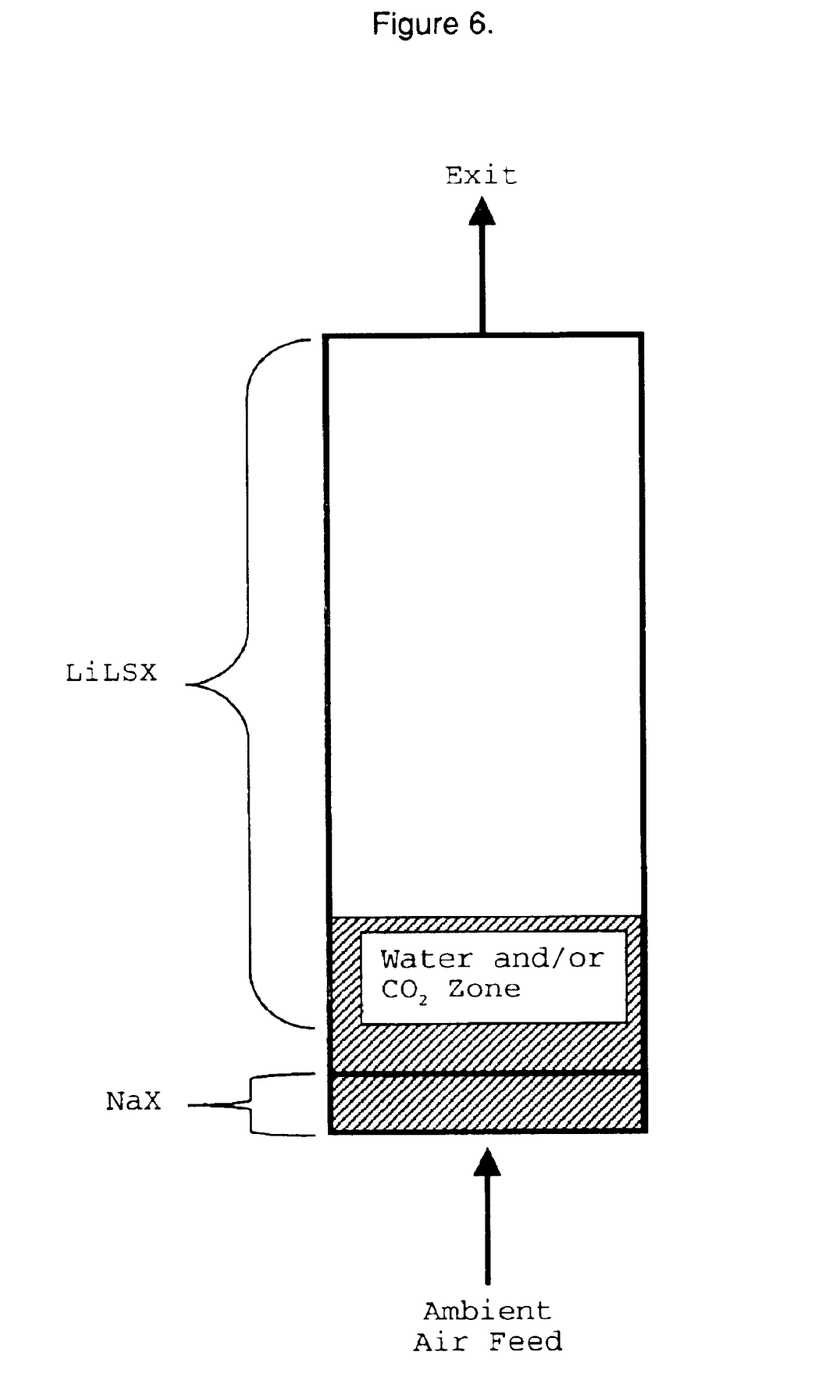
FIG. 6 is a schematic drawing of a second embodiment of the present invention.

FIG. 6 shows another example of this invention. A shallow layer of NaX has been used. In this example, water and/or carbon dioxide penetrate past the NaX layer and into the main adsorbent layer.

EXAMPLE 3

Figure 7:
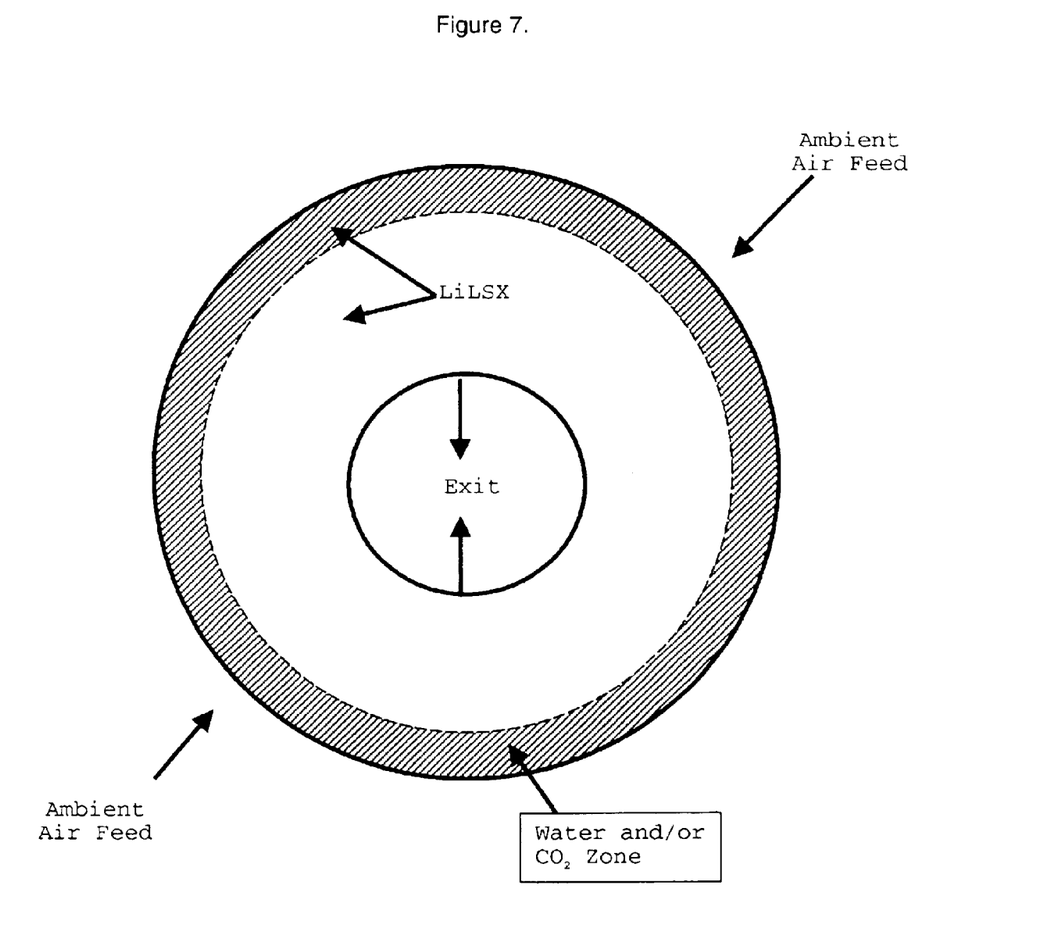
FIG. 7 is a schematic drawing of a third, radial bed embodiment of the present invention.

FIG. 7 shows an embodiment of the invention in a radial flow configuration. The entire annular region of the radial flow vessel is filled with LiLSX. Water and/or carbon dioxide penetration is shown as an outer ring within this layer, with the remainder of LiLSX available for nitrogen/oxygen separation. This invention is especially advantageous for radial flow beds because only a single adsorbent is necessary, thereby avoiding the complexities associated with multiple layers.

While the invention has been described in detail and with reference to specific examples thereof, it will be apparent to one skilled in the art that various changes and modifications can be made therein without departing from the spirit and scope thereof.

What is claimed is:

1. A process for separating a feed gas into at least one product gas, said process comprising:
   providing a gas separation apparatus comprising at least one adsorption layer comprising a lithium-exchanged FAU adsorbent having water desorption characteristics, defined by drying curves, similar to those for the corresponding fully sodium-exchanged FAU, and having a heat of adsorption for carbon dioxide equal to or lower than that for the corresponding fully sodium-exchanged FAU at high loadings of carbon dioxide, wherein said lithium-exchanged FAU adsorbent contains less than 0.01% calcium and less than 0.01% magnesium;
   feeding into said gas separation apparatus said feed gas comprising nitrogen, oxygen, and at least one of carbon dioxide and water;
   adsorbing water and/or carbon dioxide onto said at least one adsorption layer; and
   collecting from said gas separation apparatus said at least one product gas comprising oxygen.

2. The process of claim 1, wherein said FAU adsorbent has a Si/Al ratio between 1.0 and 1.3.

3. The process of claim 2, wherein said adsorbent has a lithium exchange level of more than 67%.

4. The process of claim 3, wherein said adsorbent is LiLSX.

5. The process of claim 3, wherein said adsorbent is LiMLSX, wherein M represents one or more elements selected from alkaline, alkaline-earth, transition metals and rare-earth groups.

6. The process of claim 1, wherein said at least one product gas contains at least 85% oxygen.

7. The process of claim 1, wherein said gas separation apparatus has a radial flow bed configuration.

8. The process of claim 1, wherein said gas separation apparatus has a cross flow configuration.

9. The process of claim 1, wherein said process comprises adsorbing water from said feed gas onto said at least one adsorption layer, and a productivity of said process for producing said product gas diminishes as a function of an amount of water adsorbed more slowly than a reference productivity of a reference process identical to said process but for use of a lithium-exchanged FAU adsorbent containing at least 0.01% calcium and/or at least 0.01% magnesium.

10. The process of claim 9, wherein the feed gas has a relative humidity greater than 70%.

* * * * *